UNITED STATES PATENT OFFICE.

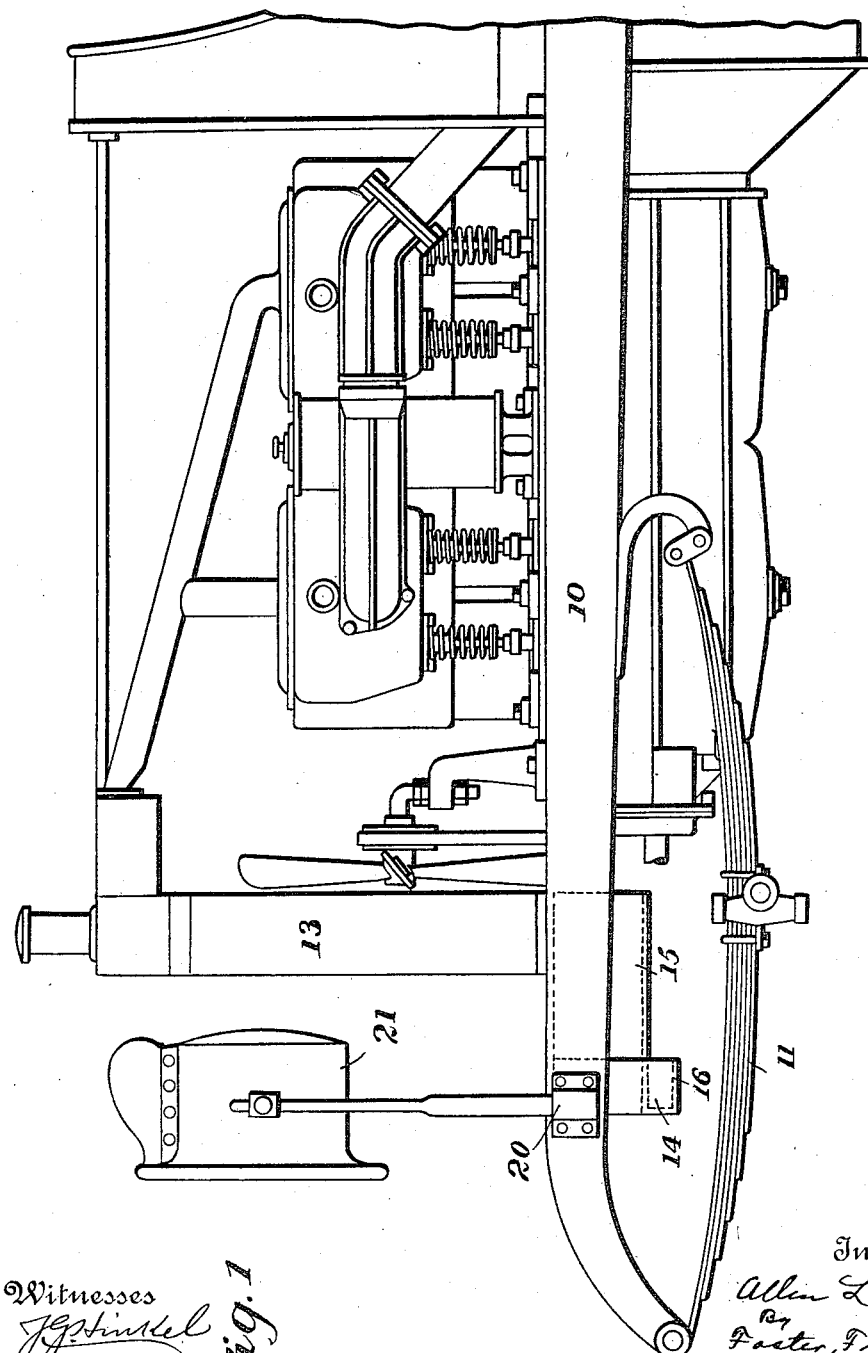

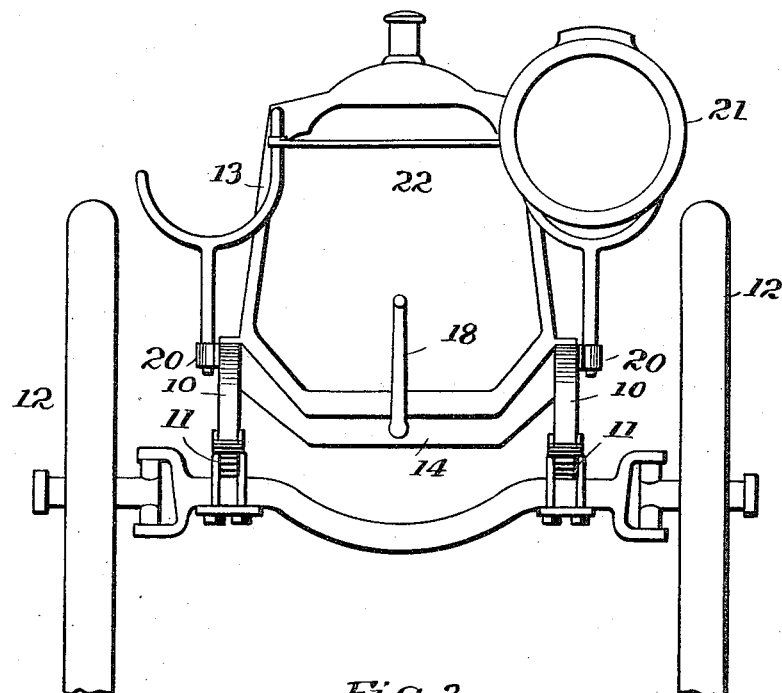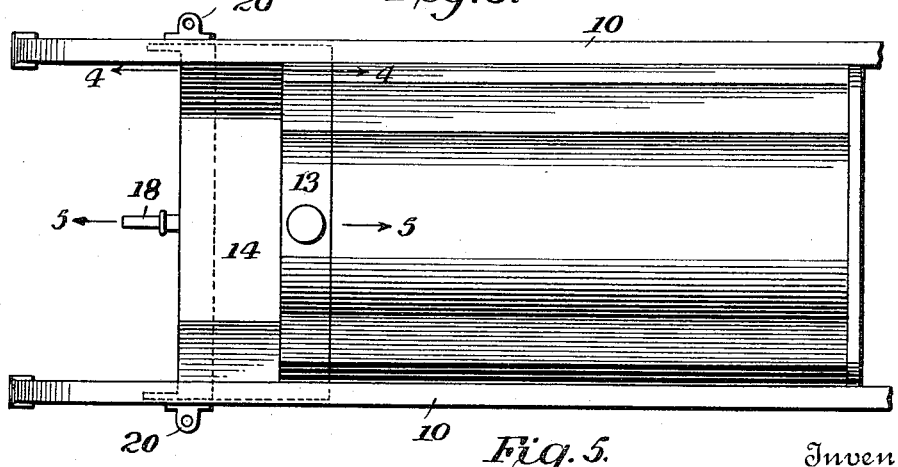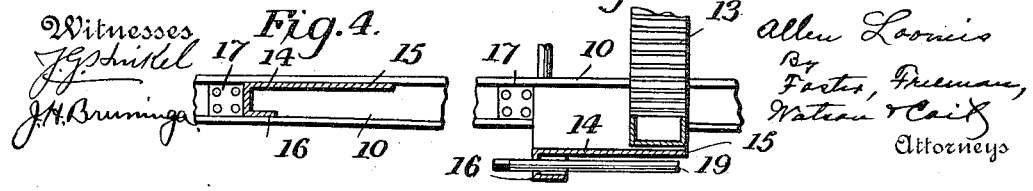

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

FRAME CROSS-BAR AND MUD-APRON.

1,175,964.

Specification of Letters Patent.

Patented Mar. 21, 1916.

Application filed March 8, 1910. Serial No. 548,062.

*To all whom it may concern:*

Be it known that I, ALLEN LOOMIS, a citizen of the United States, and resident of Detroit, county of Wayne, State of Michigan, have invented certain new and useful Improvements in Frame Cross-Bars and Mud-Aprons, of which the following is a specification.

This invention relates to motor vehicles and particularly to the frame construction. In motor vehicles as now constructed it is found that the lamps are subjected to considerable vibration which is transmitted from the frame. The radiator is also exposed to mud and water thrown up against the same by the road wheels, resulting in clogging of the radiator.

One of the objects of this invention is to construct a frame, brace it, and support the lamps in such a manner from the frame that the vibration is prevented.

Another object is to provide a mud apron which will protect the radiator.

Further objects will appear from the detailed description.

The invention will be described in connection with the accompanying drawings, in which—

Figure 1 is a side elevation of a part of a motor vehicle; Fig. 2 is a front elevation; Fig. 3 is a plan view; Fig. 4 is a section on the line 4—4 Fig. 3; Fig. 5 is a section on the line 5—5 Fig. 3.

Referring to the drawings, 10 designates the side members of a motor vehicle frame, 11 the springs, and 12 the road wheels. A radiator 13 is supported by the side members and as usual is located forwardly of the engine, which is covered by a hood. A cross member or bar 14 connects the side members 10. This cross member is located forwardly of the radiator and is of channeled section, one of the flanges 15 being wider than the other flange 16. The cross member is of the construction shown in Fig. 2, and the flange 15 extends rearwardly and underneath the radiator 13, as shown in Fig. 5. The cross member is secured to the side members in any suitable manner. In the specific embodiment shown the connection is made by fasteners passing through the side members and lugs 17 which are formed on the cross member. The starting crank 18 has its shaft extending through the web of the cross member, as shown in Figs. 2 and 5.

Lamp brackets 20 are secured to the side member at the points of attachment of the cross member. In the specific embodiment shown some of the fastening means pass through the lugs 17, the side members 10 and the brackets 20. The standards for the lamps 21 are supported in these brackets and in order to additionally brace the lamps the standards are connected by a bar 22. The widened flange 15 of the cross member forms a mud guard or apron, which will protect the radiator against the mud and water thrown up by the road wheels. In this way clogging of the radiator is prevented. The starting crank is placed in an accessible position so that it will not interfere with the mud apron. By placing the lamp brackets at the points of attachment of the cross member with the side members the vibration is reduced to a minimum. It is necessary to place these lamps forwardly of the radiator in order that the lamps may clear the same. Where the cross member is placed directly underneath the radiator as in prior constructions, the side members will vibrate considerable at the points where the lamp brackets are attached to the same, since this vibration will naturally take place about the connection between the side members and the cross members as an axis. In this construction the lamp brackets are attached at points where the vibration is a minimum.

It is obvious that various changes may be made in the details of construction without departing from this invention, and it is, therefore, to be understood that this invention is not to be limited to the specific construction shown and described.

Having thus described the invention, what is claimed is:

1. In a motor vehicle, the combination with the side members of the frame and the radiator supported near one end of the frame, of a cross member connecting the side members forward of the radiator and comprising a channel section having its web secured to the side members and having one of its flanges extending rearwardly to the radiator.

2. In a motor vehicle, the combination with frame side members, of a radiator supported by the frame, a cross member comprising a channel section and forming a part of the vehicle frame, one of the flanges of said cross member being wide and forming a mud apron, lamp brackets supported by the side members, and fastenings passing through said lamp brackets, side members and cross member.

3. In a motor vehicle, the combination with side members, of a radiator supported by said side members, a cross member comprising a channel section and forming a part of the vehicle frame, one of the flanges of said cross member being wide and forming a mud apron, and a starting crank having a shaft extending through the web of said channel section.

In testimony whereof I affix my signature in presence of two witnesses.

ALLEN LOOMIS.

Witnesses:
E. N. HEARN,
M. F. SHAFER.